United States Patent [19]

Kanoh et al.

[11] Patent Number: 5,198,081
[45] Date of Patent: Mar. 30, 1993

[54] METHOD AND ELECTRODE FOR ELECTROCHEMICAL RECOVERY OF LITHIUM VALUE FROM AQUEOUS SOLUTION

[75] Inventors: Hirofumi Kanoh, Takamatsu; Kenta Ooi, Kagawa; Yoshitaka Miyai, Takamatsu; Shunsaku Katoh, Kagawa, all of Japan

[73] Assignee: Japan as represented by Director General of Agency of Industrial Science and Technology, Tokyo, Japan

[21] Appl. No.: 841,562

[22] Filed: Feb. 26, 1992

[30] Foreign Application Priority Data

Mar. 4, 1991 [JP] Japan .................................. 3-123190

[51] Int. Cl.$^5$ ................................................ C25F 1/22
[52] U.S. Cl. .................................................. 204/105 R
[58] Field of Search ..................................... 204/105 R

[56] References Cited

U.S. PATENT DOCUMENTS 3,597,340  8/1971  Honeycutt ........................... 204/128

Primary Examiner—T. M. Tufariello
Attorney, Agent, or Firm—Wenderoth, Lind & Ponack

[57] ABSTRACT

A novel and efficient electrochemical method is disclosed for the recovery of lithium value from an aqueous solution containing lithium ions in a relatively low concentration together with ions of various kinds of other metallic impurity elements. The method comprises electrochemical selective adsorption of lithium ions from the aqueous solution on to a specific working electrode by applying a DC voltage of a relatively low DC voltage of 0.1–0.4 volt versus a saturated calomel electrode to the working electrode as the cathode opposed to a counterelectrode as the anode and then desorption of the lithium ions therefrom by applying a DC voltage of 0.7–1.2 volts versus a saturated calomel electrode to the lithium-bearing working electrode as the anode opposed to a counterelectrode as the cathode in an aqueous desorption medium containing an electrolyte such as a lithium salt. At least the surface layer of the working electrode is formed from an oxide of manganese prepared by admixing a manganese compound with a limited amount of a lithium or magnesium compound, converting the mixture into oxides by a heat treatment in an oxidizing atmosphere and then removing the lithium or magnesium therefrom by leaching in an acid solution or by an electrochemical means.

11 Claims, No Drawings

METHOD AND ELECTRODE FOR ELECTROCHEMICAL RECOVERY OF LITHIUM VALUE FROM AQUEOUS SOLUTION

BACKGROUND OF THE INVENTION

The present invention relates to an efficient method for the electrochemical recovery of lithium value from an aqueous solution containing various kinds of metallic ions including lithium and an electrode used therefor. More particularly, the invention relates to a method for the recovery of lithium value from an aqueous solution containing various kinds of metallic ions by the selective electrochemical adsorption of lithium ions on an electrode having a surface layer of a unique material as well as to an electrode used for practicing the method.

The industrial importance of lithium either in the metallic form or in the form of a chemical compound is rapidly increasing in recent years in a variety of application fields such as fine ceramics, batteries, coolant absorbent, pharmacological materials and the like. A still more rapid increase of demand is expected in the near future for the lithium materials as a constituent in high-capacity batteries, aluminum-based alloys, nuclear-fusion fuels and the like.

As is known, lithium metal and lithium compounds are currently produced mainly from lithium-containing minerals such as spodumene, amblygonite, petalite, lepidolite and the like and, in some cases, from water of certain salt lakes or underground salty water containing lithium in a relatively high concentration.

Occurrence of these lithium resources, however, is globally rather localized so that some countries such as Japan deficient in lithium resources must rely for the supply of source materials of lithium entirely on import. It would therefore be an important technological issue in such lithium-deficient countries to develop a method for producing lithium metal or compounds even from a source material of which the content of lithium is so low that the conventional methods for the recovery of lithium value cannot be applied thereto for the economical reason.

It is known that geothermally hot underground water or hot-spring water sometimes contains lithium in a considerably high, though not high enough as an economical lithium resource, concentration. Sea water, of course, contains lithium although the concentration of lithium therein is as low as 0.2 mg/liter, i.e. far lower than the commercially profitable level by any conventional methods of lithium recovery. Accordingly, it is eagerly desired in such lithium-deficient countries to develop an efficient and economical method for the recovery of lithium value even from a source material in which the content of lithium is very low as compared with the contents of other metallic constituents.

Several methods have heretofore been proposed for the recovery of lithium value from an aqueous solution of low lithium content such as sea water and certain underground water. The major current of these prior art methods consists in the utilization of selective adsorption of lithium ions on a specific adsorbent from the aqueous solution containing various kinds of other metallic ions. The adsorbent materials for the purpose proposed in the prior art include amorphous aluminum hydroxide disclosed in Japanese Patent Kokai 55-10541, hydrated tin oxide disclosed in Japanese Patent Kokai 67-61623, tin antimonate disclosed in Japanese Patent Kokai 58-167424, bismuth phosphate disclosed in Japanese patent Kokai 59-195525, titanic acid after a specific heat treatment disclosed in Japanese Patent Kokai 61-72623 and oxide of manganese disclosed in Japanese Patent Kokai 61-171535 and 61-228344, of which the manganese oxide-based adsorbents are the most promising in respect of the high selectivity for the adsorption of lithium ions in such a degree that the content of lithium ions as adsorbed relative to the other impurity metallic ions sometimes can be as high as to be comparable with that in low-grade lithium minerals.

The method of using a manganese oxide-based adsorbent, however, is not always quite feasible as an industrial process since, while the lithium value adsorbed on the adsorbent must be recovered from the adsorbent by desorption, the process of lithium desorption must be carried out in an acidic aqueous solution or in an organic solution containing an acidic oxidizing agent which can be prepared only under a strict control of the preparation conditions and the process of desorption must be carried out under very strictly controlled conditions necessarily leading to a large labor cost and difficulty in mass recovery of the lithium value.

Alternatively, a method of solvent extraction is proposed, for example, in Journal of Inorganic and Nuclear Chemistry, volume 30, page 2,807 (1968) and Chemistry Letters, 1986, page 713 for the separation, enrichment and purification of lithium value starting from an aqueous solution of low lithium concentration. This method, however, is also not practical because, if not to mention the expensiveness of cryptand as a specific extractant solvent used in the method, the separation factor for lithium from other impurity elements is so low that a sufficiently high purity of the lithium as recovered can be obtained only by many times repetition of the cycles of extraction and back-extraction resulting in a very high cost as a consequence of the extremely troublesome and laborious process for the recycling of the solvent with consumption of a large quantity of energy.

SUMMARY OF THE INVENTION

The present invention accordingly has an object to provide a novel and efficient method for the recovery of lithium value from an aqueous solution of a relatively low lithium concentration among other kinds of metallic ions as impurities by the selective adsorption of the lithium ions on an adsorbent and desorptioon of the adsorbed lithium value from the adsorbent.

The invention accordingly provides a method for the recovery of lithium value from an aqueous solution containing lithium ions and other kinds of metallic ions as impurities, which comprises the steps of;

(a) applying a direct-current voltage in the range from 0 to 0.7 volt versus a saturated calomel electrode to a working electrode as the cathode opposed to a counterelectrode made from a metal or carbonaceous material as the anode in an aqueous solution containing lithium ions and metallic impurity ions to effect selective adsorption of the lithium ions on the working electrode;

(b) transferring the working electrode bearing the lithium ions adsorbed thereon into an aqueous desorption medium; and (c) applying a direct-current voltage in the range from 0.7 to 1.2 volts versus a saturated calomel electrode to the working electrode as the anode opposed to a counterelectrode made from a metal or carbonaceous material as the cathode in the aqueous desorption medium to effect desorption of the lithium ions from the working electrode into the aqueous desorption medium, at least the surface layer of the working electrode being formed from an oxide of manganese having a structure of spinel.

The above mentioned spinel-type manganese oxide forming at least the surface layer of the working electrode is prepared by a process comprising the steps of:

(A) admixing a manganese compound with a compound of lithium or magnesium to form a mixture;
(B) heating the mixture at an elevated temperature in an oxidizing atmosphere to form an oxide of manganese impregnated with the compound of lithium or magnesium;

and;

(C) removing the compound of lithium or magnesium from the oxide of manganese.

DETAILED DESCRIPTION OF THE PREFERRED EMBODIMENTS

As is described above, the method of the invention is an electrochemical process for the adsorption and desorption of lithium ions on and from a working electrode, of which at least the surface layer is made from a specific material having electroconductivity and adsorptivity of lithium ions.

The electrode material for the working electrode is an oxide of manganese having a structure of spinel which is obtained by the above described process comprising the steps (A), (B) and (C). In step (A) of the process, a compound of manganese is admixed with a compound of lithium or magnesium as an additive to form a mixture. The manganese compound as the base ingredient of the mixture is exemplified by, including the compounds in which manganese is in different valency states, oxides, e.g., dioxide and sesguioxide, hydroxides, halides, e.g., chlorides, bromides and iodides, sulfates, carbonates, nitrates, oxalates and the like of manganese though not particularly limitative thereto, of which manganese nitrate and manganese oxyhydroxide are preferred.

The lithium compound as the additive to the above named manganese compound is exemplified by oxide, hydroxide, halides, e.g., chloride, bromide and iodide, carbonate, nitrate and the like of lithium though not particularly limitative thereto, of which lithium nitrate and lithium carbonate are preferred. The magnesium compound as the additive to the above named manganese compound is exemplified by oxide, hydroxide, halides, e.g., chloride, bromide and iodide, carbonate, nitrate and the like of magnesium though not particularly limitative thereto, of which magnesium hydroxide is preferred. If desired, lithium compounds and magnesium compounds can be used in combination.

The manganese compound and the lithium and/or magnesium compounds are mixed together in such a proportion that the molar ratio of Li:Mn or Mg:Mn is in the range from 1:10 to 1:1 or, preferably, from 1:5 to 1:2. The manganese compound and the additive compound are mixed together as intimately as possible, for example, by using a suitable pulverization blending machine such as ball mills.

The powder mixture of the manganese compound and the lithium or magnesium compound is then subjected, in step (B), to a heat treatment in an oxidizing atmosphere at a temperature in the range from 200° to 1,000° C. or, preferably, in the range from 400° to 900° C. so as to give a material to be shaped into an electrode precursor made from manganese oxide containing lithium or magnesium. When the starting compound or compounds are not oxides, the compounds can be converted into the respective oxides by this heat treatment which is usually complete within 4 hours though dependent on the temperature of the heat treatment. The heat treatment of the mixture is carried out under an oxidizing atmosphere such as air in order to produce the respective oxides from the manganese compound and lithium or magnesium compound assuming that they are not oxides or to promote formation of the spinel-type manganese oxide even when the starting compounds are oxides.

The heat treatment can be performed, of course, of the powder mixture as such but it is preferable that the powder mixture, optionally with admixture of a suitable binder such as an organic polymer, e.g., fluorocarbon resins, polyacrylonitrile, polyvinyl chloride and polyvinyl alcohol, or an inorganic binder, e.g., water glass, is compression-molded, prior to the heat treatment, into the form of a desired working electrode which is then subjected to the heat treatment while retaining the form of the electrode into an electrode precursor. It is of course optional that the powder mixture subjected to the heat treatment as such is subsequently compression-molded into the form of an electrode. It is further optional according to need that the powder mixture is admixed with a fine powder of a suitable electroconductive material such as carbon and metals in order to increase the electroconductivity of the working electrode made from the manganese oxide.

It is sometimes advantageous to provide an electrode substrate made from a metal such as platinum with a coating layer of manganese oxide in respect of the mechanical strength of the working electrode. Such a coating layer of manganese oxide can be formed in several different ways. For example, the starting manganese compound and lithium or magnesium compound are dissolved together in a suitable liquid medium, e.g., aqueous or organic solvents as well as acids, to form a coating solution which is applied to the surface of a metalmade substrate followed by a heat treatment or calcination to decompose and convert the compounds into the form of oxides, if necessary, by repeating this procedure until an oxide layer of a desired thickness can be obtained. Alternatively, the starting manganese compound and lithium or magnesium compound each in the form of a fine powder are mixed together with a small volume of a liquid containing a suitable binder dissolved therein to form a pasty mixture with which the surface of a metal-made substrate is coated to form a coating layer which is then dried and converted into an oxide layer by a heat treatment. The oxide coating layer of the electrode precursor should have a thickness of at least 0.5 $\mu$m because, when the thickness is too small, the working electrode would have an unduly small capacity for the adsorption of lithium not to be suitable for practical use.

The precursor of the working electrode prepared in the above described manner, of which at least the surface layer is formed from manganese oxide containing lithium or magnesium, is then subjected, in step (C), to a treatment for the removal of the lithium or magnesium contained therein. This treatment is performed by immersing the electrode precursor in an acidic aqueous solution having a pH not higher than 6 or, preferably, not higher than 3 so that lithium or magnesium contained in the manganese oxide is leached out into the aqueous solution leaving manganese oxide. Use of an acidic solution having a too strong acidity is undesirable because the manganese oxide may also be dissolved at least partly. The acid used in this treatment is not particularly limitative including inorganic acids such as hydrochloric, sulfuric and nitric acids and organic acids such as oxalic, acetic and citric acids. The removal of lithium or magnesium should be as complete as possible or the content of residual lithium or magnesium in the manganese oxide of the working electrode should be as small as possible in order to obtain a high capacity of the manganese oxide for the adsorption of lithium ions although it is usually difficult to decrease the content of lithium or magnesium not to exceed a few % of the initially contained amount. This leaching treatment is complete usually within 24 hours though dependent on various factors such as the concentration of the acid, temperature, content of lithium or magnesium in the manganese oxide of the electrode precursor and the like.

In an alternative method for the preparation of the working electrode, the manganese oxide containing lithium or magnesium as obtained in the form of a powder by the heat treatment of the mixture of a manganese compound and a lithium or mganesium compound is, without being shaped into an electrode precursor, subjected to the treatment for the removal of lithium or magnesium by acid leaching and then shaped into the desired form of a working electrode by compression molding or by forming a coating layer thereof on a metal substrate, if necessary, with the aid of a binder.

Alternatively and preferably, the treatment for the removal of lithium or magnesium from the manganese oxide of the electrode precursor can be performed electrochemically by applying a direct-current voltage of 0.7 to 1.2 volts versus a saturated calomel electrode to the electrode precursor as the anode opposed to a metallic counterelectrode as the cathode in an aqueous solution containing an electrolyte to support ionic conduction through the solution. Though not particularly limitative, lithium salts such as lithium chloride can be used satisfactorily as the electrolyte since the disadvantage of contamination with metallic ions other than lithium can be avoided thereby. This electrochemical method is preferred to the acid-leaching method because dissolution of manganese oxide does not take place in this case.

The manganese oxide prepared in the above described manner has a crystallographic structure of spinel and is semi-electroconductive with a conductivity in the range of around $10^{-5}$ to $10^{-3}$ S.cm$^{-1}$.

The working electrode prepared in the above described manner from the electrode precursor is then used in the inventive method for the recovery of lithium value from an aqueous solution containing various kinds of metallic ions by the selective adsorption of lithium ions. In step (a) of the inventive method, the working electrode and a counter-electrode made from a metal or carbonaceous material are held in the lithium-containing aqueous solution and a direct-current voltage is applied therebetween with the working electrode as the cathode and the counterelectrode as the anode. The metal forming the counterelectrode is not particularly limitative including noble metals, e.g., platinum, gold, palladium, rhodium, osmium and iridium, and base metals, e.g., nickel, iron, lead, zinc and copper, although electrodes made from or plated with a noble metal are preferred. It is preferable that the aqueous solution from which the lithium ions are adsorbed on the working electrode has a value of pH higher than 4 or, preferably, higher than 5 in order to avoid dissolution of the manganese oxide. The direct-current voltage to be applied between the electrodes naturally depends on various factors such as the acidity or alkalinity of the aqueous solution, concentration of the lithium ions in the aqueous solution, temperature, types of the manganese oxide forming the working electrode and the like but, assuming that the pH of the aqueous solution is about 5, the voltage should be up to 0.7 volt or, preferably, in the range from 0.1 to 0.4 volt versus a saturated calomel electrode (S.C.E.). The current through the aqueous solution is usually in the range from 0.01 to 3 mA per cm$^2$ of the effective surface area of the working electrode at the beginning of step (a) though dependent on various factors and decreases as the adsorption of the lithium ions on the working electrode proceeds finally to level off.

Though dependent on various factors, the working electrode usually has a capacity for the adsorption of lithium ions in the range from 35 to 40 mg of lithium per g oxide. The working electrode after adsorption of the lithium ions as fully as desired to approach saturation is, in step (b), transferred into an aqueous desorption medium, preferably, after thorough rinse to remove the adhering solution containing impurities. In order to ensure ionic conduction through the aqueous desorption medium, the aqueous desorption medium should contain an electrolyte dissolved therein. It is important that the electrolyte to support the ionic conduction through the aqueous medium can be easily separated from the recovered lithium value by an economical method since otherwise the electrolyte is an undesirable impurity hardly separable from the lithium value. For example, a salt of lithium, e.g., chloride, can be a quite satisfactory electrolyte in this case. The concentration of the electrolyte in the aqueous desorption medium is at least 0.1 mM or, preferably, in the range from 0.1 mM to 5 M in order to ensure good ionic conduction through the desorption medium. The aqueous desorption medium should have a value of pH not lower than 4.5.

In step (c) of the inventive method, a direct-current voltage is applied between the working electrode bearing lithium ions adsorbed thereon as the anode and a counter-electrode made from a metal or carbonaceous material as the cathode so that the lithium value adsorbed on the working electrode is desorbed and released from the working electrode into the aqueous desorption medium in the form of lithium ions. The metal forming the counterelectrode can be the same one as the counterelectrode used in step (a). The voltage to be applied between the electrodes, which should be substantially higher than the voltage applied between the electrodes in step (a), is usually in the range from 0.7 to 1.2 volts versus a saturated calomel electrode assuming neutrality of the aqueous desorption medium. The current density on the working electrode is usually in the range from 0.01 to 3 mA per cm$^2$ of the surface area of the working electrode. This procedure of desorption is complete usually within 5 hours though dependent on various factors such as the amount of the lithium ions adsorbed on the working electrode, current density on the working electrode, conditions of the aqueous desorption medium and the like. The working electrode thus freed from lithium by desorption can be used repeatedly in the next run of lithium recovery beginning with the step (a). Advantageously, the working electrode of manganese oxide described above is very stable even in repetition of the procedure not to cause substantial decrease of the capacity for the selective adsorption of lithium ions. It is not always necessary that the aqueous desorption media used in step (c) of the second run and later on are each a freshly prepared one but the aqueous desorption medium thus loaded with lithium ions as desorbed from the working electrode in the first run can be used as such in the second and subsequent runs so that the concentration of lithium therein can be increased one run by one run to reach a desirable concentration.

In the following, the method of the present invention is illustrated in more detail by way of examples. In one of these examples, the aqueous desorption medium used in the step of desorption contained potassium chloride as the electrolyte to support conduction through the medium. This was merely for the purpose to facilitate checking of the desorption of lithium ions from the working electrode and, needless to say, use of a compound of an alkali metal other than lithium as the conduction-supporting electrolyte in step (c) is not practical.

EXAMPLE 1

An aqueous coating solution containing manganese and lithium was prepared by dissolving lithium nitrate and manganese nitrate in water in concentrations of 1 mole/liter and 2 moles/liter, respectively, corresponding to a Li:Mn molar ratio of 0.5. A platinum plate of 10 mm by 10 mm wide and 0.3 mm thick was coated with this coating solution and, after drying, subjected to a heat treatment in air at 830° C. for 2 minutes so as to convert the nitrates into the respective oxides followed by cooling to room temperature. This procedeure of coating with the coating solution, drying, heat treatment and cooling was repeated 20 times finally followed by a heat treatment at 830° C. for 5 minutes to obtain an electrode precursor. The oxide layer thus formed on the platinum substrate had a thickness of about 0.8 μm.

The electrode precursor above obtained was held in a 10 mM aqueous solution of lithium chloride at 25° C. and a direct-current voltage of 1.0 volt versus a saturated calomel electrode was applied to the electrode precursor as the anode opposed to a platinum wire of 0.5 mm diameter as the cathode so that lithium ions were desorbed and released from the coating layer into the aqueous solution to give a working electrode having a coating layer of manganese oxide freed from lithium. The residual content of lithium in the manganese oxide layer was about 0.3 mg lithium per g of manganese dioxide $MnO_2$ indicating that 97% or more of the lithium contained in the oxide layer of the electrode precursor had been removed.

The thus prepared working electrode was immersed and held together with a platinum wire of 0.5 mm diameter as a counterelectrode in 20 ml of one of the lithium-containing simulation solutions A, B, C, D and E containing, in addition to lithium chloride in a concentration of 10 mM, 10 mM of sodium chloride, 10 mM of potassium chloride, 10 mM of rubidium chloride, 10 mM of cesium chloride, and a combination of 10 mM of sodium chloride, 10 mM of potassium chloride, 10 mM of rubidium chloride and 10 mM of cesium chloride, respectively. A direct-current voltage was applied between the working electrode as the cathode and the counterelectrode as the anode held in the simulation solution kept at 25° C. The voltage was scanned decreasingly from 1.0 volt at the start down to 0.2 volt versus a saturated calomel electrode at a constant scanning velocity of 0.1 mV/second to effect selective adsorption of the lithium ions on to the manganese oxide layer of the working electrode.

The manganese oxide layer after the selective adsorption of lithium was taken and dissolved in an acid solution and the solution was analyzed by the atomic absorption spectrophotometry for the content of each of the alkali metal elements relative to manganese to find that the content of lithium was 36, 32, 33, 34 and 25 mg lithium per g of manganese dioxide $MnO_2$ for the simulation solutions A, B, C, D and E, respectively, while none of the alkali metal elements other than lithium could be detected in each of the manganese oxide layers indicating that the selectivity for the adsorption of lithium ions relative to the other alkali metal ions was very high.

The working electrode after the selective adsorption of lithium ions from the simulation solution A was taken out and, after thorough rinse with deionized water, immersed and held in 20 ml of a 10 mM aqueous solution of potassium chloride together with a platinum wide of 0.5 mm diameter as the counterelectrode and a direct-current voltage of 1.0 volt versus a saturated calomel electrode was applied to the working electrode as the anode opposed to the counterelectrode as the cathode for 5 hours at 25° C. to effect desorption of lithium ions from the manganese oxide layer of the working electrode. The manganese oxide layer of the working electrode after this lithium desorption treatment was analyzed for the content of lithium relative to manganese to find that the residual content of lithium was about 3 mg lithium per g of manganese dioxide $MnO_2$ indicating that 90% or more of the lithium contained in the manganese oxide layer had been desorbed by the electrochemical treatment.

EXAMPLE 2

Lithium carbonate and manganese oxyhydroxide were taken in such a proportion that the molar ratio of Li:Mn was 0.5 and they were thoroughly pulverized and mixed together. The mixture was subjected to a heat treatment in air at 850° C. for 4 hours to obtain a manganese oxide powder containing lithium. The lithium containing manganese oxide powder was subjected to acid leaching of lithium by immersing in an aqueous 1M hydrochloric acid for 5 hours at 25° C. so that the content of lithium in the manganese oxide powder was decreased to about 1.6 mg lithium per g of manganese dioxide $MnO_2$.

A 200 mg portion of the thus obtained manganese oxide powder was blended with 100 mg of a graphite powder and 50 mg of a Teflon powder and the powder blend was compression-molded in a metal mold under a pressure of 3 tons/cm$^2$ for 10 minutes into a disc having a diameter of 13 mm, which was used as the working electrode.

The procedure for the selective adsorption of lithium ions was substantially the same as in Example 1 by using the same simulation solutions A, B, C, D and E. Atomic absorption spectrophotometric analysis was undertaken for the content of each of the alkali metal elements relative to manganese in the working electrodes to find that the content of lithium was 31, 27, 27, 29 and 21 mg lithium per g of manganese dioxide $MnO_2$ for the simulation solutions A, B, C, D and E, respectively, while none of the alkali metal elements other than lithium could be detected in each of the working electrodes of manganese oxide indicating that the selectivity for the adsorption of lithium ions relative to the other alkali metal ions was very high.

Each of the working electrodes after selective adsorption of lithium ions was immersed and held at 25° C. In 20 ml of a 10 mM aqueous solution of lithium chloride together with a platinum wire of 0.5 mm diameter as the counterelectrode and a direct-current voltage of 1.0 volt versus a saturated calomel electrode was applied for 3 hours between the working electrode as the anode and the counterelectrode as the cathode to effect desorption of lithium from the working electrode. Thereafter, the working electrode after desorption of lithium was taken out and analyzed for the content of lithium relative to manganese to find that more than 93% of the lithium ions selectively adsorbed on the working electrode had been desorbed in each of the working electrodes for the simulation solutions A to E.

EXAMPLE 3

Magnesium hydroxide and manganese oxyhydroxide were taken in such a proportion that the molar ratio of Mg:Mn was 0.5 and they were thoroughly pulverized and mixed together. The powder mixture was subjected to a heat treatment in air at 1,000° C. for 2 hours to obtain manganese oxide powder containing magnesium. A 200 mg portion of the thus obtained magnesium-containing manganese oxide powder was blended with 100 mg of a graphite powder and 50 mg of a Teflon powder and the powder blend was compression-molded in a metal mold under a pressure of 3 tons/cm$^2$ for 10 minutes into a disc having a diameter of 13 mm to serve as a precursor of the working electrode.

The thus prepared disc of magnesium-containing manganese oxide was immersed and held as a working electrode in 20 ml of a 10 mM aqueous solution of lithium chloride together with a platinum wire of 0.5 mm diameter as a counterelectrode and a direct-current voltage of 1.0 volt versus a saturated calomel electrode was applied to the working electrode as the anode opposed to the counterelectrode as the cathode for 5 hours to remove magnesium from the manganese oxide so that the content of magnesium in the manganese oxide was decreased to about 5.7 mg magnesium per g of manganese dioxide $MnO_2$.

The procedure for the selective adsorption of lithium ions was substantially the same as in Example 1 by using the same simulation solutions A, B, C, D and E except that the voltage scanning was conducted from 1.0 volt to 0.3 volt. Atomic absorption spectrophotometric analysis was undertaken for the content of each of the alkali metal elements relative to manganese in the working electrode to find that the content of lithium was 26, 16, 23, 24 and 14 mg lithium per g of manganese dioxide $MnO_2$ in the working electrodes from the simulation solutions A, B, C, D and E, respectively, while the working electrodes from the simulation solutions A, B, C and E contained 1.0 mg of sodium, 2.0 mg of potassium, 1.3 mg of rubidium and a combination of 1.0 mg of sodium, 1.3 mg of potassium and 0.7 mg of rubidium, respectively, per g of manganese dioxide $MnO_2$. No cesium could be detected in the working electrodes from the simulation solutions D and E.

Desorption of lithium from the working electrodes after the selective adsorption of lithium from the simulation solution was conducted in substantially the same manner as in Example 2 to find that the residual content of lithium remaining in the working electrode was 10% or smaller of the content before desorption in each of the working electrodes from the simulation solutions A to E.

What is claimed is:

1. A method for the recovery of lithium value from an aqueous solution containing lithium ions and other kinds of metallic ions as impurities, which comprises the steps of:
   (a) applying a direct-current voltage in the range from 0 to 0.7 volt versus a saturated calomel electrode to a working electrode as the cathode opposed to a counterelectrode made from a metal or carbonaceous material as the anode in an aqueous solution containing lithium ions and metallic impurity ions to effect selective adsorption of the lithium ions on the working electrode;
   (b) transferring the working electrode bearing the lithium ions adsorbed thereon into an aqueous desorption medium containing an electrolyte dissolved therein; and
   (c) applying a direct-current voltage in the range from 0.7 to 1.2 volts versus a saturated calomel electrode to the working electrode as the anode opposed to a counterelectrode made from a metal or carbonaceous material as the cathode in the aqueous desorption medium to effect desorption of the lithium ions from the working electrode into the aqueous desorption medium, at least the surface layer of the working electrode being formed from an oxide of manganese having a structure of spinel.

2. The method for the recovery of lithium value from an aqueous solution containing lithium ions and other kinds of metallic ions as impurities as claimed in claim 1 in which the manganese oxide having a structure of spinel forming at least the surface layer of the working electrode is prepared by a process comprising the steps of:
   (A) admixing a manganese compound with a compound of lithium or magnesium to form a mixture;
   (B) heating the mixture at an elevated temperature in an oxidizing atmosphere to form an oxide of manganese containing lithium or magnesium; and
   (C) removing lithium or magnesium from the oxide of manganese.

3. The method for the recovery of lithium value from an aqueous solution containing lithium ions and other kinds of metallic ions as impurities as claimed in claim 2 in which the compound of manganese and the compound of lithium or magnesium are mixed in step (A) in such a proportion that the molar ratio of Li:Mn or Mg:Mn is in the range from 1:10 to 1:1.

4. The method for the recovery of lithium value from an aqueous solution containing lithium ions and other kinds of metallic ions as impurities as claimed in claim 3 in which the compound of manganese and the compound of lithium or magnesium are mixed in step (A) in such a proportion that the molar ratio of Li:Mn or Mg:Mn is in the range from 1:5 to 1:2.

5. The method for the recovery of lithium value from an aqueous solution containing lithium ions and other kinds of metallic ions as impurities as claimed in claim 2 in which the temperature of heating in step (B) is in the range from 200° C. to 1,000° C.

6. The method for the recovery of lithium value from an aqueous solution containing lithium ions and other kinds of metallic ions as impurities as claimed in claim 5 in which the temperature of heating in step (B) is in the range from 400° C. to 900° C.

7. The method for the recovery of lithium value from an aqueous solution containing lithium ions and other kinds of metallic ions as impurities as claimed in claim 2 in which, in step (C), lithium or magnesium is removed from the oxide of manganese containing lithium or magnesium by immersing the oxide of manganese in an aqueous acid solution.

8. The method for the recovery of lithium value from an aqueous solution containing lithium ions and other kinds of metallic ions as impurities as claimed in claim 2 in which, in step (C), lithium or magnesium is removed from the oxide of manganese containing lithium or magnesium electrochemically by applying a direct-current voltage between the oxide of manganese as the anode and a counterelectrode as a cathode in an aqueous electrolyte solution.

9. The method for the recovery of lithium value from an aqueous solution containing lithium ions and other kinds of metallic ions as impurities as claimed in claim 1 in which the electrolyte contained in the aqueous desorption medium is a salt of lithium.

10. The method for the recovery of lithium value from an aqueous solution containing lithium ions and other kinds of metallic ions as impurities as claimed in claim 1 in which the aqueous desorption medium has a value of pH not lower than 4.5.

11. The method for the recovery of lithium value from an aqueous solution containing lithium ions and other kinds of metallic ions as impurities as claimed in claim 1 in which the direct-current voltage applied to the working electrode in step (a) is in the range from 0.1 to 0.4 volt versus a saturated calomel electrode.

* * * * *